April 14, 1959 — L. G. DETERDING ET AL — 2,881,660

PROJECTOR SYSTEM

Filed Feb. 19, 1957

INVENTORS:
Leo G. Deterding
John B. Sonderman
George H. Matter

Their Patent Attorney

United States Patent Office 2,881,660
Patented Apr. 14, 1959

2,881,660

PROJECTOR SYSTEM

Leo G. Deterding, Anaheim, John B. Sonderman, Livermore, and George H. Matter, Anaheim, Calif., assignors to Northrop Aircraft, Inc., Hawthorne, Calif., a corporation of California Application February 19, 1957, Serial No. 641,073

8 Claims. (Cl. 88—24)

This invention has to do with a projector system that is in the nature of a system of lenses, mirrors and a light source that projects an image of a marker onto a surveillance screen.

The description of the invention to follow will be devoted primarily to the discussion of aircraft and aircraft control centers as well as aircraft surveillance areas. The potentialities following the description will become obvious, but it may be stated that the projector system may be used in conjunction with harbor operations; it may be used on board ships; for civil defense, and for airport air traffic control and ground control operations, just to name a few.

Heretofore, such elaborate systems of operation and control have been complex, expensive, and in general in many if not most instances unsatisfactory. One example will be given to illustrate the inadequacy of the presently used but, for most purposes, obsolete method of maintaining surveillance over flying aircraft.

There is an aircraft control center that is in direct communication with radar operation. A transparent surveillance screen is usually provided in the control center and a number of persons are constantly kept busy translating the information gained from radar operation to the screen. Immediately the possibility of human error occurs in the area of translation. Such an error could very easily be considered disastrous. Additionally, the communication system could become inoperable. Again such a result could be disastrous. Eventually, over a period of time the surveillance screen is so cluttered with information that no one is able to understand the situation, past, present or future. Chaos could result; possibilities of compounding errors could occur; and general confusion would more than likely be apparent.

Further, the presently used system requires a large compartment or room and is rigid as distinguished from being mobile.

An object of this invention is to provide a projector system for radar surveillance that eliminates most if not all of the possible human errors that could occur between translating radar information from the operation to the control center.

Another object of this invention is to provide a projector system that is interconnected to and may be considered ancillary equipment providing facilities for receiving information from a radar set scope, filtering it, and presenting the filtered data on a surveillance screen for use in an air control center or the like, resulting in a reduction in the number of personnel required to present the desired data.

A yet further object of this invention is to provide a projector system that presents up to the minute information without transmission or translation delay.

A yet further object of this invention is to provide a projector system that requires a minimum of operating space and is mobile.

A still further object of this invention is to provide a projector system, coupled to a radar tube, that uses a system of lenses, mirrors and a light source to project filtered or essential data onto a surveillance screen.

Briefly the invention comprises a beam splitter assembly, a plotting surface upon which is suitably placed a chip marker that corresponds to and represents the position of a "pip" that is registered on a radar scope, a chip marker illuminating assembly, an optical assembly designed to project an image of the position of the chip marker onto a surveillance screen, and a projection assembly for projecting a grid or the like on to the screen by which the chip marker may be located with respect to a given environment.

Figure 1:
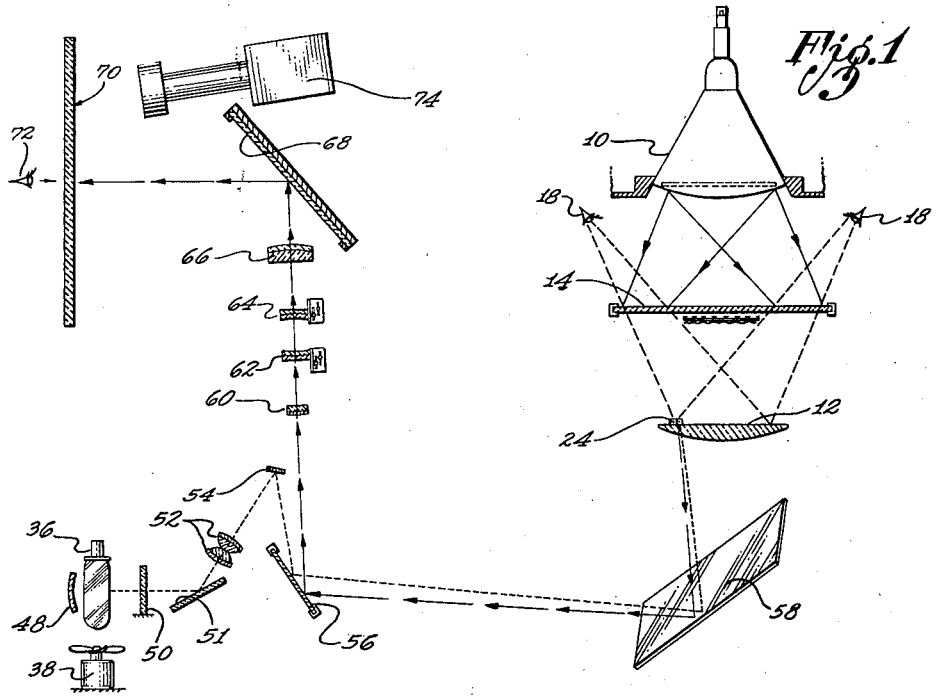
Figure 1 is a schematic view illustrating and having embodied therein the present invention.
Figure 2:
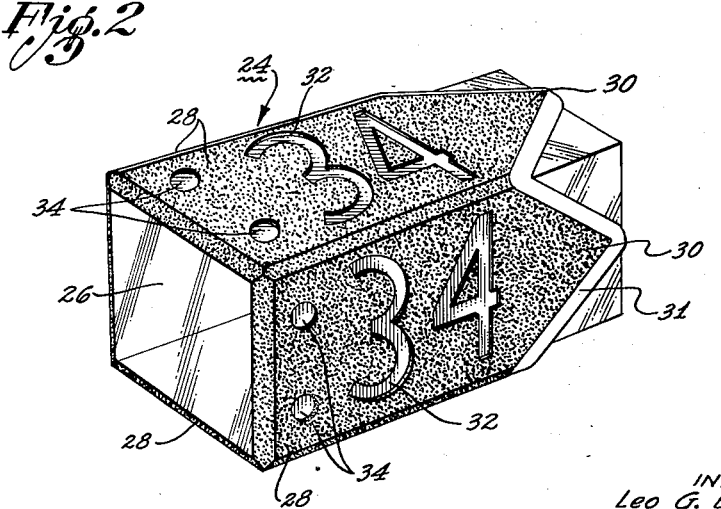
Figure 2 is an enlarged, perspective view illustrating the chip marker.

Referring to the drawings for a more detailed description of the present invention 10 designates a radar or cathode ray tube suitably mounted. Midway between a combination transparent plotting surface and lens 12 and the tube 10 is a vertically adjustable beam splitter 14. On the side of the beam splitter nearest the plotting surface is an ultra-violet light source 16.

It is well known that a cathode ray or radar tube used in the manner stated has projected on the surface thereof what have become known as "pips" or "blips." Additionally, a scanning pattern is also registered which may be in the nature of land masses and the like.

The projector system operators being in the position indicated by 18 and 19 see the pips and the scanning pattern reflected on the beam splitter. At the same time the operator can see through the beam splitter. As has been stated, the beam splitter 14 is midway between the plotting surface 12 and the tube 10. Therefore, an optical phenomena results which may be described as follows: The image of a point object formed by reflection in a plane mirror is known to be located the same distance behind the reflecting surface that the object is in front of it. For an extended object, each image point is similarly created and the complete image may be constructed readily. The rays from each point enter the eyes as a diverging pencil, and the image is at the point where the prolongations of these rays intersect.

Therefore, it may be said that the pattern that may be reflected onto the beam splitter 14 is seen as if it appeared on the plotting surface 12. It may then be stated that if the operators viewing the beam splitter along the line 20 saw a pip it would appear as if the operator saw it at the termination of the line 22. Stated in a different manner, the pattern and pips being reflected on the beam splitter 14 are superimposed on plotting surface 12. The result is that a pip image would seem to appear on the plotting surface 12 in linear alignment with the pip that appeared on tube 10. The pip may represent a moving or stationary object. Once the operator 18 locates the pip he marks its position by a marker chip broadly designated 24.

The marker chip comprises a transparent or translucent solid glass or plastic body or core 26. It may be seen that the body is, in the embodiment illustrated, a rectangular block having four equal sides. Opposite sides are as near to being parallel as is possible.

A glass filter 28 aluminized on one side to provide a mirror is bonded to each side of the body 24 and each filter may have a color different from each of the other three filters. Each mirror is formed in such a manner as to provide a directional indicating apex 30 on one end. Further each mirror may have on the surface or etched therein an indicating numeral 32 and a series of dots 34.

A prearranged color, numeral, dot code may be provided whereby the color of the mirrors made known would indicate one thing, such as a known or unknown, friend or foe aircraft; the dots may indicate the general type, and the numerals the number of aircraft.

The mirror surfaces must also be parallel with the plotting surface 12. Any deviation from parallel will result in reduction of efficiency or complete failure of operation.

Each numeral and dot is covered or filled with a phosphorescent material that radiates in the presence of the ultra-violet light source. The operator 18 may readily see this radiation. The color of the material in each numeral and dot system will correspond to the color of the mirror opposite. In other words, if the operator 18 would see a red numeral and dot, the mirror opposite, not seen by the operator, would be red.

Further, each apex 30 will be defined or outlined by phosphorescent material as indicated at 31.

A light source or projection tube 36 is provided that is cooled by a fan 38. The light from the source is reflected off the mirror and through a heat absorbing transparent plate 50. The light is further reflected from an inclined mirror 51 through a light condenser 52 that is in the nature of a pair of condenser doublet or mere simple lenses. From the condenser the light is again reflected off an inclined mirror 54 and onto another inclined mirror 56. From the inclined mirror 56 the light is reflected to the inclined mirror 58 and from the latter onto the mirror 28 of the chip marker 24. The light reflected from inclined mirror 58 passes through the plotting lens and surface 12, which serves as a collimator.

All that structure just defined and connected by the dotted line in Figure 1 may be considered the chip marker illuminating assembly.

The following defined structure may be considered the optical assembly. The light is reflected from mirror 28 back through the plotting lens 12, which now functions as a condenser, to mirror 58 and 56. From mirror 56 the light passes through a lens 60 which may be used to adjust focus, adjustable doublet lenses 62 and 64, and fixed couplet lens 66. Lenses 62 and 64 are adjustable for the purpose of magnifying or reducing the image of the mirror 28. The lens 60 is adjustable for the purpose of bringing into sharp focus the image of the mirror 28.

The light after passing through lens 66 is reflected off an inclined mirror 68 and onto a transmission type screen 70.

An individual 72 may see the image of the chip marker or mirror from the back side of the screen 70 as may be determined by referring to Figure 1.

A slide projector 74 may or may not be provided whereby a grid or map of a particular area may be projected onto the screen 70.

A brief operation of the device follows: A "pip" from the radar tube 10 is superimposed on the plotting surface 12 and marked with a chip marker 24 in the manner as previously described. The mirror 28 of the marker reflects a light in the manner described and an image of the marker is readily seen on the transmission screen 70. The position of the screen may be adjusted for the reason that the image may be magnified or reduced by lenses 62 and 64 and brought into sharp focus by lens 60.

If the pip represents an aircraft or moving object, the chip marker may be moved to follow the course of the aircraft and the apex 30 will indicate the direction of flight. A viewer 72 may follow the movement of the image or chip marker 24 and perform such functions as are required with regard to the aircraft.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. A projector system comprising a cathode ray tube upon which a scanning pattern is registered including objects represented by "pips"; a transparent plotting surface upon which chip markers having a reflective surface may be placed in such a manner as to correspond to the position of the pips that are registered on the cathode ray tube; a beam splitting plate, between said tube and surface, from which the pattern and pips are reflected and which appears to be in the same plane as the plotting surface; and means for projecting an image of said markers on a surveillance screen.

2. A projector system comprising a cathode ray tube upon which a scanning pattern is registered including objects represented by "pips"; a transparent plotting surface upon which chip markers, having at least one reflective surface, may be placed in such a manner as to correspond to the position of the pips that are registered on the cathode ray tube; a beam splitting plate, midway between said tube and surface, from which the pattern and pips are reflected and which appears to be in the same plane as the plotting surface; a chip marker illuminating assembly associated with said plotting surface; and means for projecting an image of the position of said markers onto a surveillance screen.

3. A projector system comprising a cathode ray tube upon which a scanning pattern is registered including objects represented by "pips"; a transparent plotting surface upon which chip markers, having at least one reflective surface, may be placed in such a manner as to correspond to the position of the pips that are registered on the cathode ray tube; a beam splitting plate, midway between said tube and surface, from which the pattern and pips are reflected and which appears to be in the same plane as the plotting surface; a chip marker illuminating assembly associated with said plotting surface; means for projecting an image of the position of said markers onto a surveillance screen; and structure that projects a pattern onto the surveillance screen.

4. A projector system comprising a cathode ray tube upon which a scanning pattern is registered including objects represented by "pips"; a transparent plotting surface upon which chip markers having a reflective surface may be placed in such a manner as to correspond to the position of the pips that are registered on the cathode ray tube; a beam splitting plate, between said tube and surface, from which the pattern and pips are reflected and which appears to be in the same plane as the plotting surface; means for projecting an image of the position of said markers onto a surveillance screen; and structure that projects a pattern onto the surveillance screen.

5. A projector system comprising a cathode ray tube upon which a scanning pattern is registered including objects represented by "pips"; a transparent plotting surface upon which chip markers, having at least one reflective surface, may be placed in such a manner as to correspond to the position of the pips that are registered on the cathode ray tube; a beam splitting plate, midway between said tube and surface, from which the pattern and pips are reflected and which appears to be in the same plane as the plotting surface; a chip marker illuminating assembly associated with said plotting surface; and means for projecting an image of the position of said markers onto a surveillance screen; said illuminating assembly being a system of lenses, mirrors and at least one projection tube.

6. A projector system comprising a cathode ray tube upon which a scanning pattern is registered including objects represented by "pips"; a transparent plotting surface upon which chip markers, having at least one reflective surface, may be placed in such a manner as to correspond to the position of the pips that are registered on the cathode ray tube; a beam splitting plate, midway between said tube and surface, from which the pattern and pips are reflected and which appears to be in the same plane as the plotting surface; a chip marker illuminating assembly associated with said plotting surface; and means for projecting an image of the position of said markers onto a surveillance screen; said means being a system of lenses and mirrors.

7. A projector system comprising a cathode ray tube upon which a scanning pattern is registered including objects represented by "pips"; a transparent plotting surface upon which chip markers, having at least one reflective surface, may be placed in such a manner as to correspond to the position of the pips that are registered on the cathode ray tube; a beam splitting plate, midway between said tube and surface, from which the pattern and pips are reflected and which appears to be in the same plane as the plotting surface; a chip marker illuminating assembly associated with said plotting surface; means for projecting an image of the position of said markers onto a surveillance screen; and structure that projects a pattern onto the surveillance screen; said illuminating assembly being a system of lenses, mirrors and at least one projection tube.

8. A projector system comprising a cathode ray tube upon which a scanning pattern is registered including objects represented by "pips"; a transparent plotting surface upon which chip markers having a reflective surface may be placed in such a manner as to correspond to the position of the pips that are registered on the cathode ray tube; a beam splitting plate, between said tube and surface, from which the pattern and pips are reflected and which appears to be in the same plane as the plotting surface; means for projecting an image of the position of said markers onto a surveillance screen; and structure that projects a pattern onto the surveillance screen; said means being a system of lenses, and mirrors.

References Cited in the file of this patent
UNITED STATES PATENTS

| | | |
|---|---|---|
| 1,549,169 | Vogt | Aug. 11, 1925 |
| 1,860,719 | Miller | May 31, 1932 |
| 1,977,120 | Dirkes et al. | Oct. 16, 1934 |
| 2,484,103 | Lewis | Oct. 11, 1949 |
| 2,499,351 | Bretz | Mar. 7, 1950 |